(12) United States Patent
Watanabe et al.

(10) Patent No.: US 6,746,000 B2
(45) Date of Patent: Jun. 8, 2004

(54) LINE-INSERTING METHOD, LINE FOR INSERTING AND OPTICAL TRANSMISSION LINE FOR INSERTING

(75) Inventors: Masaaki Watanabe, Gifu (JP); Hiroshi Tahara, Gifu (JP)

(73) Assignee: Ichimatsu Denki Koji Co., Ltd., Gifu (JP)

( * ) Notice: Subject to any disclaimer, the term of this patent is extended or adjusted under 35 U.S.C. 154(b) by 0 days.

(21) Appl. No.: 10/198,968

(22) Filed: Jul. 22, 2002

(65) Prior Publication Data

US 2003/0010965 A1 Jan. 16, 2003

Related U.S. Application Data

(63) Continuation-in-part of application No. 09/717,118, filed on Nov. 22, 2000, which is a continuation-in-part of application No. 09/239,952, filed on Jan. 29, 1999, now abandoned.

(51) Int. Cl.[7] .............................................. B65H 59/00
(52) U.S. Cl. ............................ 254/134.4; 254/134.3 R
(58) Field of Search ...................... 254/134.4, 134.3 R, 254/134.3 FT

(56) References Cited

U.S. PATENT DOCUMENTS

| 832,401 | A | | 10/1906 | Martin |
|---|---|---|---|---|
| 1,114,637 | A | | 10/1914 | Nolan |
| 1,738,836 | A | | 12/1929 | Boves |
| 3,119,600 | A | | 1/1964 | Bitter |
| 3,301,531 | A | | 1/1967 | Corsiglia |
| 3,793,732 | A | | 2/1974 | Hamrick |
| 4,216,738 | A | | 8/1980 | Muta |
| 4,498,659 | A | | 2/1985 | Brockelsby, III |
| 4,602,763 | A | | 7/1986 | Gaylin |
| 4,774,739 | A | | 10/1988 | Sherman, Jr. |
| 5,297,582 | A | | 3/1994 | Kitajima et al. |
| 5,374,034 | A | * | 12/1994 | Flores et al. ............. 254/134.4 |
| 5,609,186 | A | | 3/1997 | Satake et al. |
| 5,740,838 | A | | 4/1998 | Satake et al. |
| 5,873,390 | A | | 2/1999 | Satake et al. |
| 5,906,357 | A | | 5/1999 | Munson, Sr. |
| 5,950,298 | A | * | 9/1999 | Griffioen et al. ............... 29/433 |
| 6,059,264 | A | * | 5/2000 | Kaminski et al. ......... 254/134.4 |
| 6,179,269 | B1 | * | 1/2001 | Kobylinski .......... 254/134.3 R |
| 6,311,953 | B1 | * | 11/2001 | Lang et al. ............... 254/134.4 |
| 6,409,155 | B1 | * | 6/2002 | Brown et al. ............ 254/134.4 |

* cited by examiner

Primary Examiner—Lee D. Wilson
(74) Attorney, Agent, or Firm—Burns, Doane, Swecker & Mathis, L.L.P.

(57) ABSTRACT

A line member inserted into a inlet port of the conduit comprises a thin nylon tape. The tape comprising the line member flies into the conduit with the fluid mechanical force in the air stream.

5 Claims, 14 Drawing Sheets

LINE-INSERTING METHOD, LINE FOR INSERTING AND OPTICAL TRANSMISSION LINE FOR INSERTING

This is a continuation-in-part of application Ser. No. 09/717,118, filed Nov. 22, 2000, which is a continuation-in-part of application Ser. No. 09/239,952, filed Jan. 29, 1999 ABN.

BACKGROUND OF THE INVENTION

1. Field of the Invention

The present invention relates to a line-inserting method, a line for inserting and an optical transmission line for inserting.

2. Description of the Related Art

U.S. Pat. No. 4,498,659, as a first prior art of the present invention, discloses the technique of connecting a flexible plastic cone member having an external diameter approximately equal to the internal diameter of the conduit to an end of a line for inserting a cable, pushing the flexible plastic cone member into the conduit from one end thereof, and blowing air into the conduit or sucking air therefrom, whereby the flexible plastic cone member is moved to the opposite end of the conduit.

U.S. Pat. No. 3,119,600, as a second prior art of the present invention, discloses the technique of pushing a soft ring member provided around a hose of a vacuum suction device into one end of the conduit.

U.S. Pat. No. 3,301,531, as a third prior art of the present invention, discloses the technique of pushing a soft ring member provided around a hose of a blower device into one end of the conduit.

In the second and third prior arts, a spherical member having an external diameter approximately equal to the internal diameter of the conduit is connected to an end of a line to be used for inserting a cable to give a thrust to the line.

These prior arts, however, intend to generate a thrust for inserting the line into the conduit, using the difference in pressure on both sides of the cone member or spherical member, each having an external diameter approximately equal to the internal diameter of the conduit, and consequently has the following problems.

In the case rust and foreign substances are attached to the inner surface of the conduit, or in the case another cable has been already inserted in the conduit, the cone member or spherical member excessively increases the friction resistance against the inner surface of the conduit or already inserted cable so that the line has not been readily inserted. In the case the conduit has right-angled corners or greatly curved portions, the line is pressed against inner surfaces of the right-angled corners or greatly curved portions to generate a great friction resistance although the line is pulled by the cone member and spherical member so that the line has not been readily inserted. For these reasons, the conventional pneumatic line-insertion system has not been widely put into practical application.

The second prior art which discloses the technique of pushing one part of the soft ring member of the hose into one end of the conduit, and sucking air from the conduit via the hose has the following problems.

First, since the soft ring member is pushed into one end of the conduit in the ring-like configuration, the cone member or spherical member which has moved within the conduit are obstructed by this soft ring member so as not to be drawn from the end of the conduit.

Next, the conduit has a specific one or small number of fixed internal diameters. So, a specific part of the conical outer surface of the soft ring member is continuously pressed on one end of the conduit, and consequently, the life of the soft ring member has become short. In the case the conduit which has been embedded in the wall is connected to a joint box, for example, the soft ring member has not been readily inserted into the joint box.

In the case another cable has been already inserted in the conduit, the end of the conduit is narrowed with both the cable and soft ring member, and cannot be sealed sufficiently. This results in the air flow in the conduit becoming worse to decrease the thrust to be applied to the line for inserting the cable into the conduit.

SUMMARY OF THE INVENTION

It is an object of the present invention to provide a new line-inserting method, a new line for inserting and a new optical transmission line for inserting, which can help line-inserting into a conduit.

The line-inserting method of the present invention makes air stream into a tubular conduit(pipe for accommodating a electric cable or a communication line) and carries the line member having a tape of which a main surface is given fluid mechanical thrust by the air stream flowing along the main surface of the tape.

Almost pulling force given to the tape in the air stream is generated by the fluid mechanical thrust and little pulling force given to tape in the air stream is generated by the friction between the main surfaces of the tape and the air stream. The fluid mechanical thrust generated on the main surfaces of the tape by the air stream is typically known as a wing theory in fluid mechanics. The tape performs like a wing of the aircraft in the air stream nevertheless the tape is very thin and very soft when it is compared to the wing. Nevertheless, the thin and soft plastic tape generates a large thrust in the air stream. For the inventor, it was the large mystery. Now, the inventor may understand the true reason about easy flight of the thin and soft plastic tape in the pipe.

The thin, soft and light plastic tape is bended easily in the air stream like wave-shape and flutters. The surface shape of the bending portions of the tape is almost same as the surface shape of the wing and bends the air stream like the wing. The wing generates the large floating force and resistive force when it is compared to a plane disposed in parallel to the air stream. The resistive force generated on the bending surface of the tape becomes the fluid mechanical thrust pulling the tape into the pipe.

The second advantage of use of the fluid mechanical interference between the main surfaces of the tape and the air stream is that the contact between the inner surface of the pipe(tubular conduit) and the tape at the sharp corner of the pipe. Its reason is that the tape is bended strongly and the large resistive force generates on the tape near the corner. Further, the air stream pushes the tape to the direction to leave from the corner. Consequently, the friction between the tape and the corner does not occur. It means the tape can fly in the pipe easily over the corner of the pipe.

The third advantage of use of the fluid mechanical interference between the main surfaces of the tape and the air stream is that the tape can fly easily into the pipe if the barrier like the cable is installed in the pipe because the thin and soft tape can easily bend along the bending air stream for avoiding the barrier. As the results, the tape can fly into the pipe having the barrier without damage when it is compared to the present stainless line for inserting cable.

The fourth advantage of use of the fluid mechanical interference between the main surfaces of the tape and the air stream is that the top portion made of the tape does not generate the large friction when it is compared to the top portion of the line with a half ball-shape disclosed by the prior patents. Such as top portion with the half ball-shape moves by the difference of the pressures. This top portion with the half ball-shape requires to decrease the air leakage into the gap between the top portion and the inner surface of the pipe. As the results, the hard top portion with the half ball-shape attaches to the inner surface of the pipe and the large friction generates. The tape-shape top portion of the present invention does not have such problem and can fly easily.

The fifth advantage of use of the fluid mechanical interference between the main surfaces of the tape and the air stream is that this fluid mechanical thrust is generated every portion of the tape. As the results, the tape does not need to have the strong anti-tension force and can have a thin thickness when it is compared the line pulled by the top portion with the half ball-shape or the cone-shape. Such line pulled the only top portion has a strong anti-tension force and become heavy and hard to move. The tape-shape top portion of the present invention does not have such problem and can fly easily.

The sixth advantage of use of the fluid mechanical interference between the main surfaces of the tape and the air stream is prefer to insert the line between two selected ports in ports of the pipe network. If the other ports are covered by the cover plates, the air stream is occurred from one port (the inlet port) to the another port (the outlet port) easily and the tape fly from the inlet port to outlet port by the air stream. Contrary to this, the flying line by the difference of the pressures which is made at the top portion of the line, is easily stuck at the point of the covered port because the large top portion of the line may changes its own proceeding direction at that point and the one part of the top portion and collides to the corner of said covered port.

The seventh advantage of use of the fluid mechanical interference between the main surfaces of the tape and the air stream is to use the ordinary and cheap material.

Further, the present invention is explained as follows. The conventional cone-like head or spherical head has an external diameter approximately equal to the internal diameter of the conduit so that when rust and foreign substances exist on the inner surface of the conduit, a great friction resistance is generated between the cone-like or spherical head and the inner surface of the conduit. This results in the insertion of the line being blocked, and, in some cases, the cone-like or spherical head being obstructed by these obstructions to stop in the tubular conduit. This problem is especially remarkable when another cable has been already inserted in the conduit.

In contrast, the head of the present invention, which has the tape, or tapes, scarcely causes any problem even when rust and foreign substances exist on the inner surface of the conduit, or cables are already placed within the tubular conduit. Consequently, the head (top portion) with tape-shape of the present invention can move in the conduit while pulling the line.

With the conventional technique, the line is pulled by the force generated due to the difference of static pressure which is applied to the cone-like head or spherical head. In contrast, with the technique of the present invention, the line is pulled by a fluid mechanical resistance force which is applied to the surface of the tape from a high speed fluid flow. In accordance with the present invention, the end of the line need not be held in nearly contact with the inner surface of the conduit to ensure such a difference of static pressure, and consequently, the head of the line is hardly caught by the already inserted cable and foreign substances existing on the inner surface of the conduit so that the movement of the head of the line is hardly obstructed thereby. In accordance with the present invention, if such foreign substances exist within the conduit, fluid flows at a high speed around them so that tape-shape head of the line also moves within the conduit automatically around these foreign substances.

If the conduit curves at approximately a right angle, the tape in accordance with the present invention preferably generates a thrust. This is caused by the fluid mechanical resistance force being applied to every portion of the tape while it flows along the right-angled part of the conduit, to force the tape therealong. In contrast, the conventional cone-like and spherical heads are difficult to move smoothly along the right-angled part of the conduit due to the configuration thereof, whereby a desirable thrust cannot be readily obtained. In accordance with the present invention, as the conduit curves greatly, the tape generates a greater fluid mechanical resistance force against the high speed fluid flow.

Furthermore, the present invention also has the operational advantage that, if one part of the tape is caught by any obstruction existing on the inner surface of the conduit, the tape separates from the obstruction immediately so that the tape is not caught by the obstruction permanently.

Said advantage will be explained with reference to FIG. 19. Reference numeral 1000 designates the tape which is blown and forced in a conduit 2000 with a high speed air flow 3000. When the tape 1000 flies in a right-angled portion 2001 of the conduit 2000, it curves, as shown in FIG. 19, and the high speed flow 3000 collides against a most curving part 1001 of the tape 1000, and a hydrodynamics buoyancy Ff and a drag (thrust) Fr are generated. Symbol x indicates the longitudinal direction of the tape at the most curving part 1001. As is known form FIG. 19, a force F is applied to the most curving part 1001 in such a direction as to separate it from a corner 2002 of the right-angled portion 2001. This results in that, if the most curving part 1001 receives a thrust Fh from the head (not shown), it is not strongly pressed against the corner 2002. Consequently, the tape 1000 smoothly flies by the thrust Fr and never contact to the corner 2002 by the force Ff generated by the high speed flow of the air stream 3000 if the conduit has plural corners. In FIG. 19, the side surface (thickness direction) of the tape 1000 is illustrated.

FIG. 20 illustrates the case a line 1010 is made of the thread pulled by the large head (not shown) generated the difference of pressure. Since fluid power is scarcely applied to the fine thread 1010, the most curving part 1011 thereof is strongly pressed against the corner 2002 of the right-angled conduit 2001 to generate a great friction resistance, and consequently, to block the insertion of the thread 1010, in some cases, cut the thread 1010.

In accordance with the present invention, the line member may have both of the thread and the tape. It is preferable to compose the threads of carbon fibers and polyamide fibers, each exhibiting an excellent tension resistance, and to compose the tape of a plastic resin which is obtained at low cost. With this arrangement, the line member which has a required tensile strength and deforms readily to exhibit hydrodynamic performance can be effected at low cost. Of course, this arrangement may be adopted as that of the head. The line member having a tape can be wound on a reel member like a reel attached to a fishing rod, thus enabling the line member to be readily retracted or drawn out for use.

The technical reason of the great thrust of the tape in the air stream is explained as bellows. If the main surface of the tape is flat, the thrust of the tape is made by the only friction and it is very small. However, the air stream is not constant and has many small whirlpools and many small disorders. By these confusion or un-uniformity, the tape has many small bending portions. If small bending portions are made, the fluid mechanical forces Ff and Fr (shown in FIG. 19) are generates by the air stream. the bending portions are still small and the fluid mechanical forces Ff and Fr (shown in FIG. 19) are small. However, the bending portions naturally develops by the fluid mechanical forces F and the force F become large by the large bending portions. After the large bending portions extremely becomes large, the shape of the large bending portions become the barrier against the air stream and the air stream changes the direction of the force F. As the results, the force F makes the bending portions small.

This change of the shape of the bending portions can not stop at the instant that the surface of the tape become flat by the inertia of the tape. Then the bending portions start to bend in the opposite direction. Consequently, the bending portions alternatively occurs in the both direction of the thickness of the tape and the fluid mechanical force F is continuously generated. Further, the whirlpools of the air stream flows toward the downstream and gives the bending force to the downstream portion of the tape by the pressure difference between the both of the main surfaces of the tape because the pressure of the air stream changes by arrival of the whirlpool. This may be the reason of the fluttering of the flag in the strong wind.

In one preferred embodiment, the tape is longer than the tubular conduit. As the results, every portion of the tape in the pipe can generate the thrust until the top portion of the tape reaches to the outlet port of the pipe.

In another preferred embodiment, the line member pulls the larger line means like an electric cable or an communication cable. The cable includes a metal cable and an optical fiber cable. Such as line member can be used instead of the present preliminary line for inserting cables.

In another preferred embodiment, the line member has a thread for reinforcing the tape. As the results, the tape become more strong and can pull a heavy large line means.

In the other preferred embodiment, the line member has a thread portion without the tape. The thread for fishing is desirable as the thread portion. Because the thread portion has a small friction and resistivity to the air stream, the tape portion of the line member can fly into the long pipe and pull the thread portion easily. In the other preferred embodiment, the top portion of the line member is consisted of plural tapes. As the results, this top portion can generate a strong pulling thrust. In the preferred embodiment, the tape can have the thickness of 0.005–0.1 mm, the width of 5–100 mm and the length of 5–500 m. The use of suction pipe is preferable to keep the cover plate keeping to cover the other ports of the tubular conduit.

In the preferred embodiment, a connecting hose connecting a suction as the air pump and the outlet port of the conduit is employed. The connecting hose has a elastic ring plate contacted to a surface of a wall around the outlet port. The negative pressure in the elastic ring presses the elastic ring to the surface of a wall around the outlet port of the conduit and decrease the air leakage into a gap between them.

In the preferred embodiment, a connecting hose connecting a suction as the air pump and the outlet port of the conduit is employed. The connecting hose has a visible window. As the results, The operator can find the arrival of the top portion of the tape easily.

The line for being inserted into a tubular conduit by air stream of the present invention has plural plastic resin tapes of which central portions in a width direction of the tapes is fixed each other (FIG. 4 or FIG. 13). This structure of the flying line in the conduit can generate a strong thrust and a small width compared with one tape type-line.

The optical transmission line of the present invention has an optical fiber and a thin plastic resin tape fixed to the optical fiber in the longitudinal direction of the optical fiber (FIG. 13). The tape for generating the fluid mechanical thrust in the air stream occurred in the tubular conduit and giving the thrust to the optical tape. It is well known that the optical fiber has very small diameter and is easy to be cut by small tension force at any portion of the optical fiber. So, the every optical fiber in prior arts has a cover tube and a wire to receive the pulling stress occurred at the pulling time. By employing the line-inserting method of the present invention, the stress of the optical fiber becomes very small because each portion of the optical fiber is given the thrust from the each portion of the tape which is near the each portion of the optical fiber individually. Accordingly, the any portion of the optical fiber does not need to pull the other portion and any portion does not need to endure a strong anti-tension. As the results, the optical transmission line of the present invention with small section area can easy to be inserted in the conduit for example the pipe of telephone line at the home by the house owner using his vacuum cleaner. As the optical fiber of the present invention, the plastic resin fiber covered by the light-reflection layer like a metal layer is prefer for decreasing the light beam like laser pulses which goes out of the strong bending portion of the optical fiber. By employing said optical transmission means of the present invention, the optical fiber can be arranged into the pipe with a small pulling force and the optical fiver does not have the damage from the pulling. This is the easy way to construct an optical Local Area Network in houses or buildings after they were built.

DETAILED DESCRIPTION OF THE PRESENTLY PREFERRED EXEMPLARY EMBODIMENTS

Preferred embodiments in accordance with the present invention will be explained.

(Embodiment 1)

Figure 1:
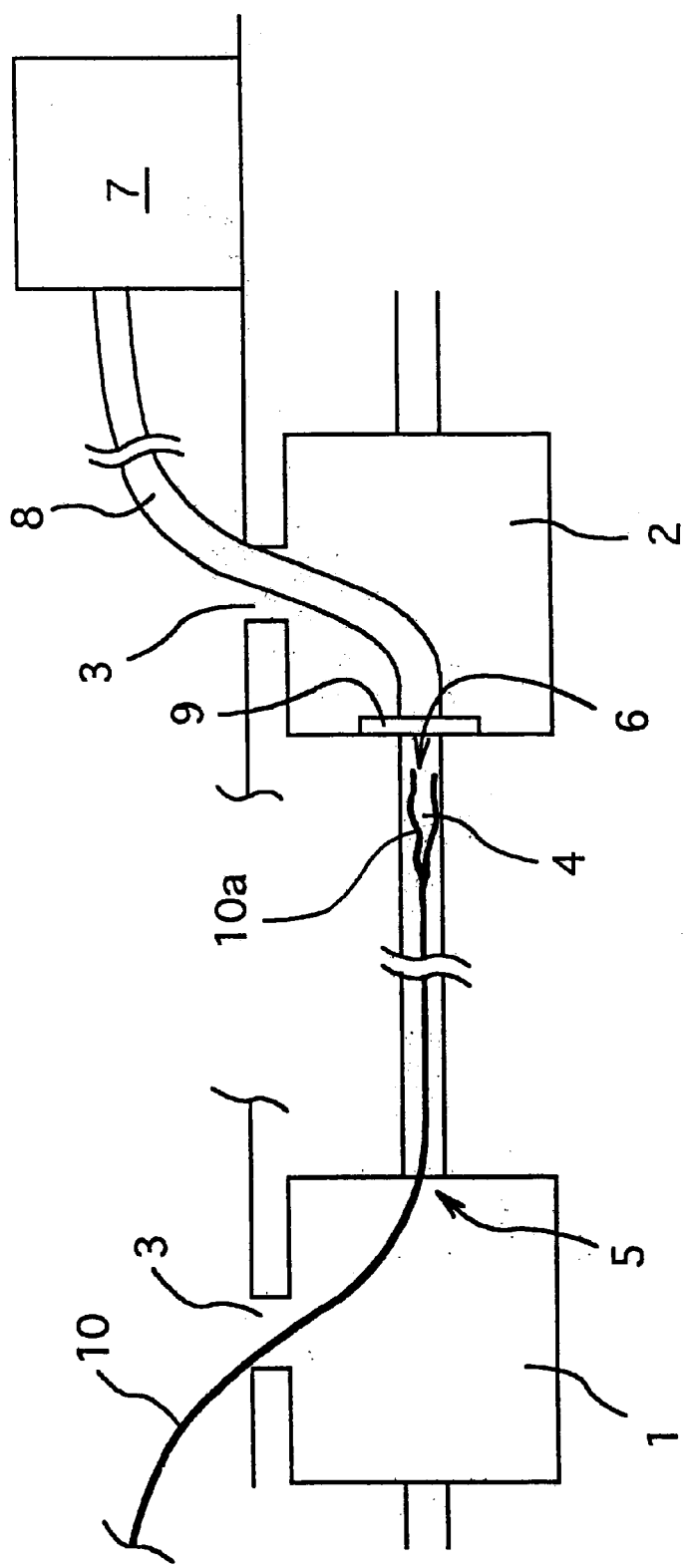
FIG. 1 is a schematic sectional view of one embodiment of a line-inserting device in accordance with the present invention.

One embodiment of the vacuum suction type line-inserting device in accordance with the present invention will be explained with reference to FIG. 1. Reference numerals 1 and 2 designate manholes provided under the road, reference numeral 3 designates a manhole opening which is not closed with a manhole cover. Reference numeral 4 designates a conduit having a diameter of about 60 mm and a length of about 300 m, which is provided between the manholes 1 and 2. An inlet port 5 of the conduit 4 opens into the manhole 1 while an outlet port 6 of the conduit 4 opens into the manhole 2. Reference numeral 7 designates suction means. An end 9 of a flexible tube 8 for use in suction work is held in pressed abutting contact with a wall around the outlet port 6 of the conduit 4. Reference numeral 10 designates a preliminary line (the line member) composed of a polyester tape. A head (top portion) 10a is consisted of two tapes provided at an end of the tape 10. The tape 10 as the preliminary line is made of one long tape wound on a drum (not shown).

In operation, after the head 10a of the preliminary line 10 is pushed into the inlet port 5 of the conduit 4 by a small amount, the suction means 7 is driven. The head 10a of the preliminary line 10 flies into the conduit 4 at a high speed. Experimental results show that the line-inserting operation is completed in merely several minutes. The flexible tube 8 is a flexible hose or bellows composed of a semitransparent resin, which enables the arrival of the preliminary line 10 to be observed visually. The end 9 of the flexible tube 8 is formed into a ring plate-configuration to be brought into close contact with a wall defining the manhole 2.

Figure 2:
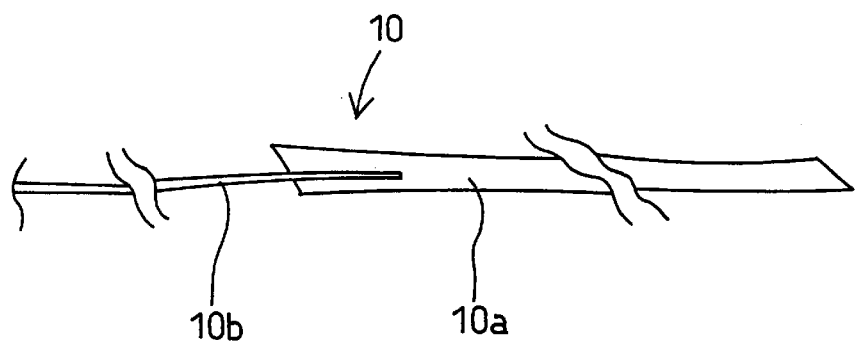
FIG. 2 is a schematic view of one modification of an end of a preliminary line.

In the modification illustrated in FIG. 2 illustrate modifications of the preliminary line (the line member) 10 which has a long tape as the head (top portion) 10a and one thread as a main portion of the preliminary line.

Figure 3:
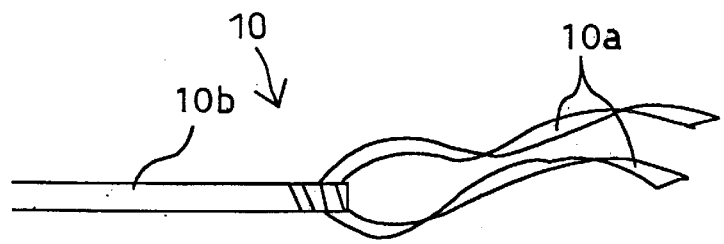
FIG. 3 is a schematic sectional view of another modification of the end of the preliminary line.

In the modification illustrated in FIG. 3, two pieces of tapes 10a, each being composed of resin, are provided at an top portion of the line 10b like a thread These tapes 10a are forced strongly with the air flow generated by sucking, and have a good flexibility, thus enabling the preliminary line 10 to be led smoothly.

Figure 4:
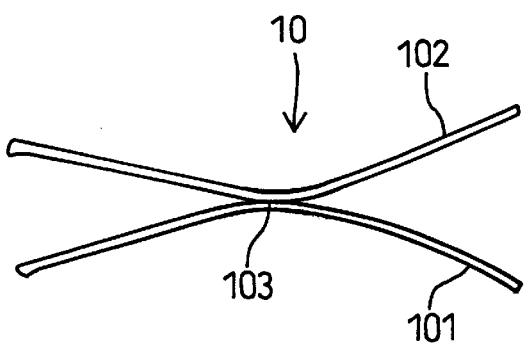
FIG. 4 is a schematic view of one modification of the preliminary line.

In the modification illustrated in FIG. 4, the line member 10 is consisted of two tapes 101,102. the central portion 103 of the tapes 101,102 in the width direction of the tapes 101,102 is fixed each other. This line member 10 can generate a strong thrust and a with a small width compared with the line member consisted of one tape. Also, the reduction of the width of the tape is preferable for the small conduit.

Figure 5:
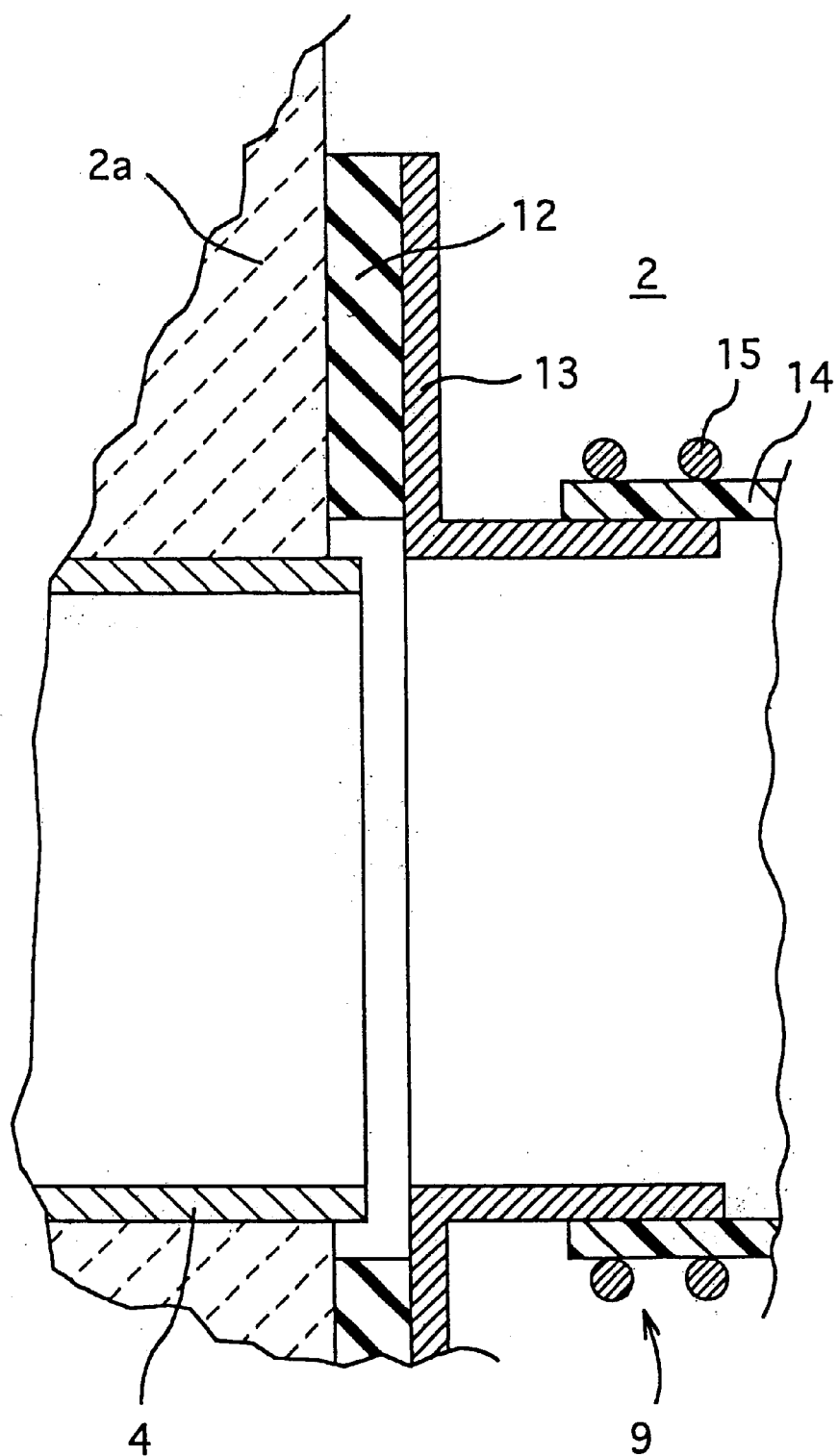
FIG. 5 is a sectional view of one modification of an end of a flexible tube (connecting hose) for use in suction work.
Figure 6:
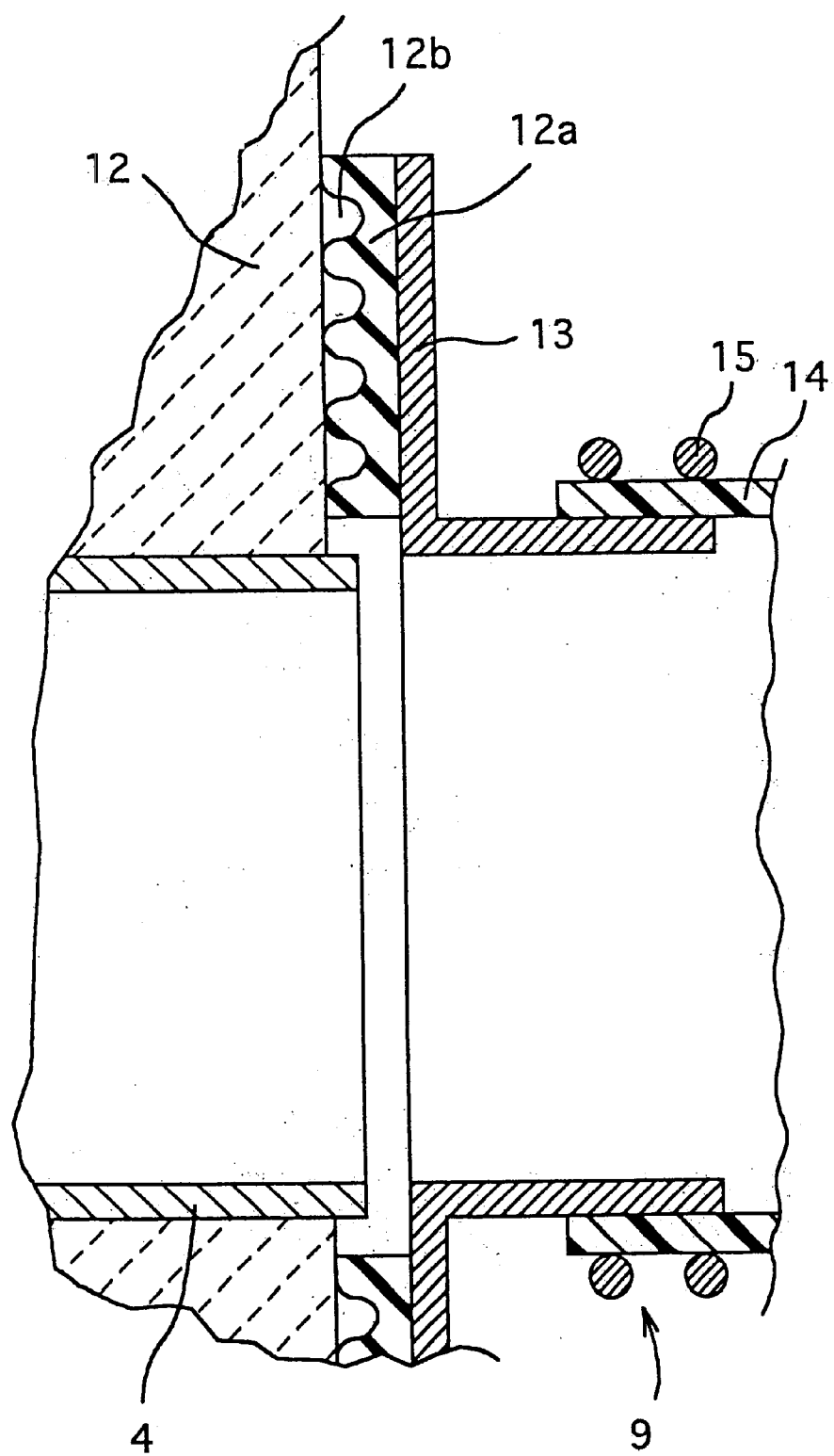
FIG. 6 is a sectional view of another modification of the end of the flexible tube (connecting hose) for use in suction work.
Figure 7:
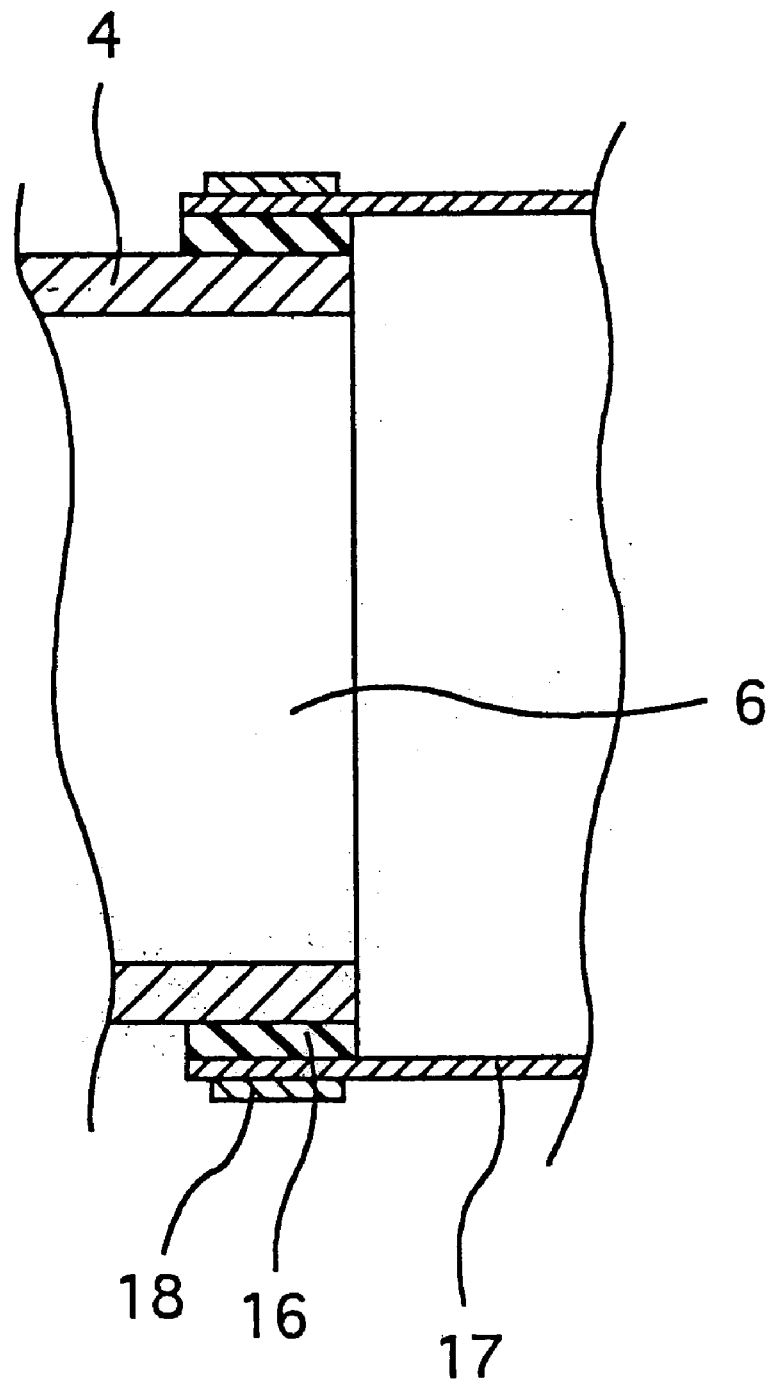
FIG. 7 is a sectional view of still another modification of the end of the flexible tube (connecting hose) for use in suction work.

FIGS. 5 to 7 illustrate modifications of the end 9 of the flexible tube 8. Reference numeral 2a designates a wall defining a manhole 2.

In the modification illustrated in FIG. 5, the end 9 of the flexible tube 8 includes a seal ring plate 12 composed of a soft rubber, flange plate 13 and bellows 14. The seal ring plate 12 is bonded to a flange portion of the flange plate 13. The bellows 14 are fitted on the flange plate 13 and tightened with rings 15.

By producing a vacuum inside the end 9 of the flexible tube 8, the flange plate 13 can press the seal ring plate 12 into close contact with a wall 2a defining the manhole 2. Of course, the flange plate 13 can be secured to the wall defining the manhole 2 with bolts or the like.

In the modification illustrated in FIG. 6, a large number of coaxial ring-like grooves 12b are provided in a surface of a seal ring plate (soft elastic member) 12a composed of a soft rubber, which is illustrated in FIG. 5. With this arrangement, the sealing properties are further improved.

In the modification illustrated in FIG. 7, the end 9 of the flexible tube 8 includes a seal cylinder 16 composed of a cylindrical soft rubber body, bellows 17 and tightening plate 18. The bellows 17 is fitted on the outlet port 6 of the conduit 4 via the seal cylinder 16 and is secured thereto by tightening the tightening plate 18. With this arrangement, air can be prevented from flowing into the flexible tube 8 from the end 9 thereof.

The preceding embodiments have been explained with reference to the case the preliminary line, that is the line for pulling a cable, is inserted into the conduit. Alternatively, it is possible to directly insert the cable into the conduit by attaching a large number of threads or tapes-like head to the end of the cable.

(Embodiment 2)

Figure 8:
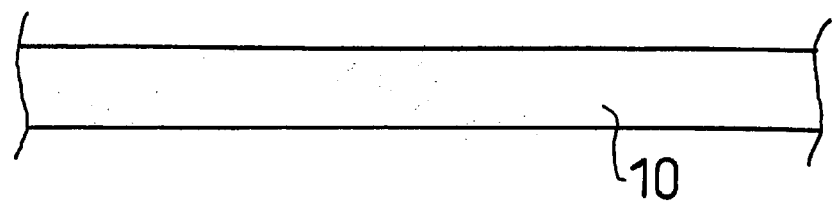
FIG. 8 is a plan view of one part of a tape-like preliminary line.
Figure 9:
FIG. 9 is a sectional view of the tape-like preliminary line of FIG. 8, taken in the direction of thickness thereof.

Another embodiment of the vacuum suction type device for inserting a line into a conduit in accordance with the present invention will be explained with reference to FIG. 8 and FIG. 9. The present embodiment employs one polyester or nylon tape as the preliminary line (line member) 10 having an excellent strength. This tape 10 has a width of about 6 mm and a thickness of 80 μm.

To arbitrarily varying the air resistance of the preliminary line 10 in accordance with the diameter or the like of the conduit, three kinds of tape-like preliminary lines 10, each having a diameter of 6 mm, 9 mm or 12 mm, are wound on different parts of a single reel (not shown). This reel is turnably supported by a shaft (not shown), and both ends of this shaft are secured to a frame (not shown). With this arrangement, the preliminary lines 10 having three different tensile strengths can be arbitrarily selected with a small-sized construction.

Figure 10:
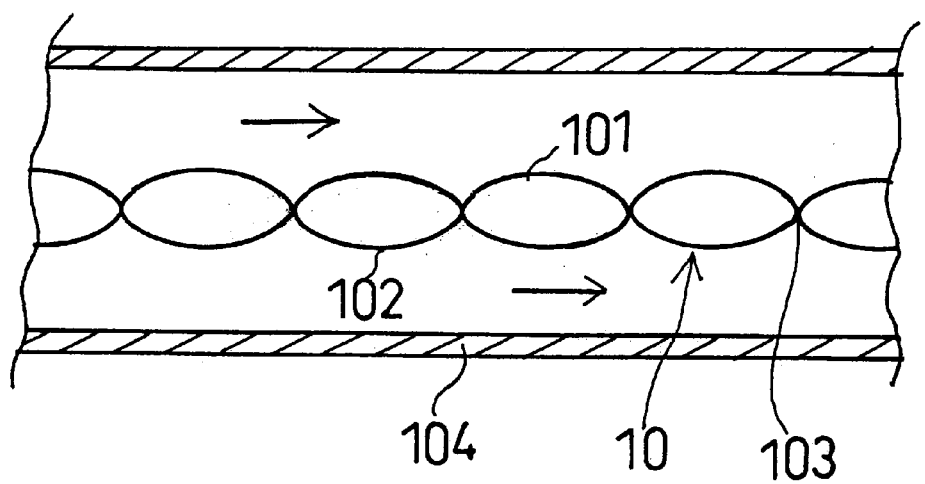
FIG. 10 is a side view of one part of one modification of the tape-like preliminary line.
Figure 11:
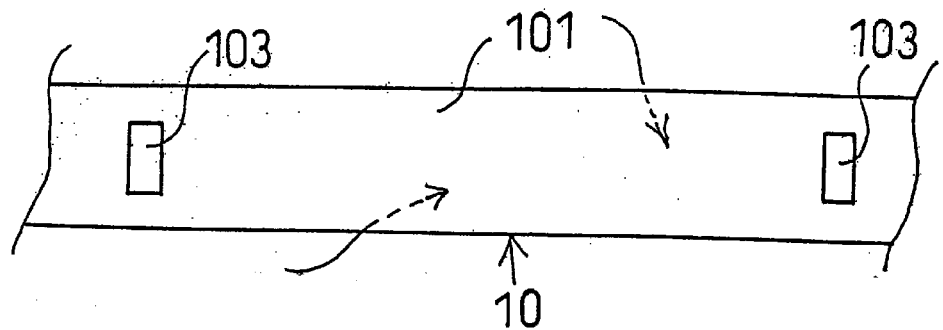
FIG. 11 is a plan view of one part of one modification of the tape-like preliminary line of FIG. 10.

One modification of Embodiment 2 is illustrated in FIG. 10 and FIG. 11. In the present modification, the tape-like preliminary line 10 is produced by placing two pieces of resin tapes 101 and 102 on each other and bonding them by fusion welding with a bonding width of 3 mm at predetermined intervals (every 30 mm, for example) in the longitudinal direction thereof. Reference numeral 103 designates bonded parts, 104 designates a conduit. With this arrangement, air flow within the conduit enter the spaces between two resin tapes to expand them, as illustrated in FIG. 10. Thus, the tape-like preliminary line 10 can generate a great air resistance.

Figure 12:
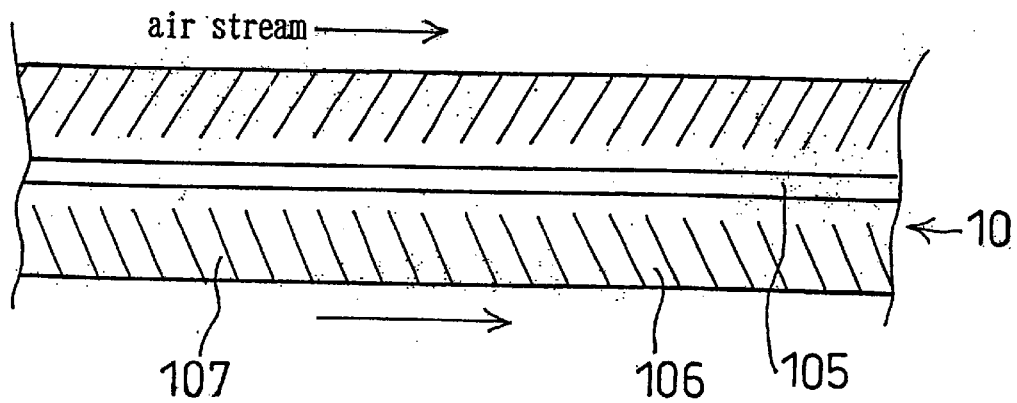
FIG. 12 is a plan view of one part of another modification of the tape-like preliminary line.
Figure 13:
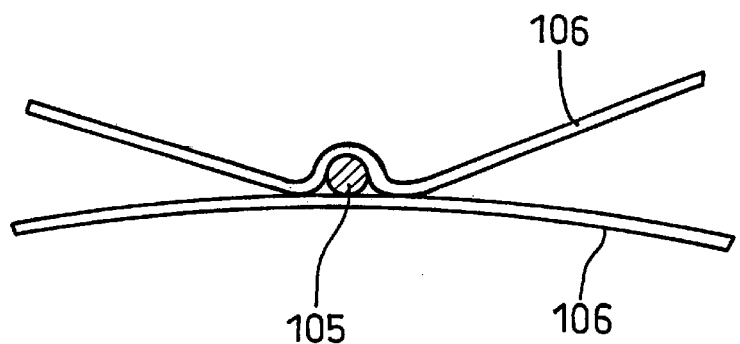
FIG. 13 is a sectional view of another modification of the tape-like preliminary line of FIG. 12, taken in the direction of thickness thereof.

Another modification of Embodiment 2 is illustrated in FIG. 12 and FIG. 13. In the present modification, the tape-like preliminary line 10 includes a linear portion 105 composed of a thick fishline, and a pair of soft tape portions 106, 106. The linear portion 105 is bonded to widthwise centers of the soft tape portions 106, 106. As illustrated in FIG. 13, the tape portions 106 are placed in a parallel relation with the linear portion 105 interposed therebetween. As illustrated in FIG. 12, slits 107 are formed in both side parts of the tape portions 106 at predetermined pitches (1 mm in the present modification) in the longitudinal direction thereof. With this arrangement, the linear portion 105 exhibits a required tensile strength so that the tape portions 106, each being divided with a large number of slits 107, can be formed much thinner, thus providing a great air resistance and flexibility (line-inserting facility) while ensuring a good tensile strength.

In the case the resin tape is used as the preliminary line (line portion) or head 10a, the surface of the resin tape may be subjected to an embossing treatment or the like to provide irregularities having a height greater than 10% of the thickness of the resin tape, as projections. Furthermore, to increase the friction resistance of the resin tape, it may be subjected to a roughening treatment. With this treatment, the friction resistance of the resin tape increases to enhance the fluid loss, whereby the thrust of the resin tape can be increased.

Figure 21:
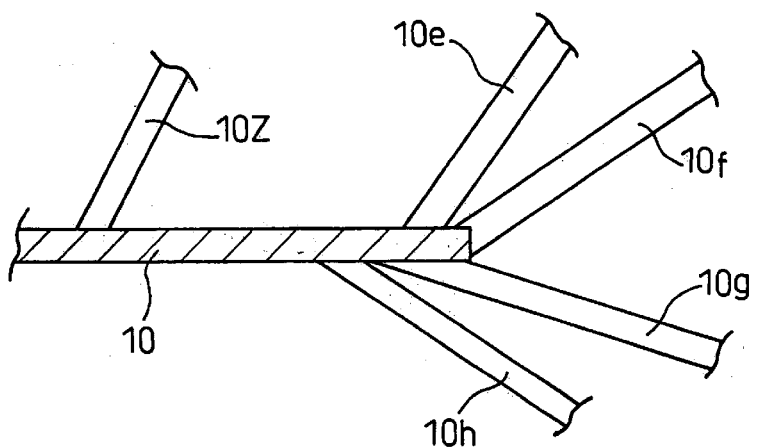
FIG. 21 is a side view illustrating one embodiment wherein a preliminary line has a linear configuration, and a projection and head have a tape-like configuration.

One preferred embodiment wherein the tape-like head 10a and projection 10z are additionally secured to the linear preliminary-line (line portion) 10 is illustrated in FIG. 21. As shown, four pieces of resin tapes 10e into 10h are respectively wound on the end of the preliminary line 10 into a spiral configuration, and adhered or fusion welded to each other. These four resin tapes 10e into 10h separate from the preliminary line 10 at different positions thereof. With this arrangement, the head can be firmly secured to the preliminary line 10 with ease, and entangling of the resin tapes 10e into 10h is reduced. This results in the damage of the resin tapes 10e into 10h due to striking themselves in a high speed air flow being decreased and the deformability thereof being not lowered. And the resin tapes 10e into 10h can be restrained from being caught by foreign substances. The projection 10z is secured to the preliminary line 10 downwardly of the end thereof, similarly to the resin tapes 10e into 10h, to apply a thrust to the preliminary line 10 downwardly of the end thereof.

Figure 22:
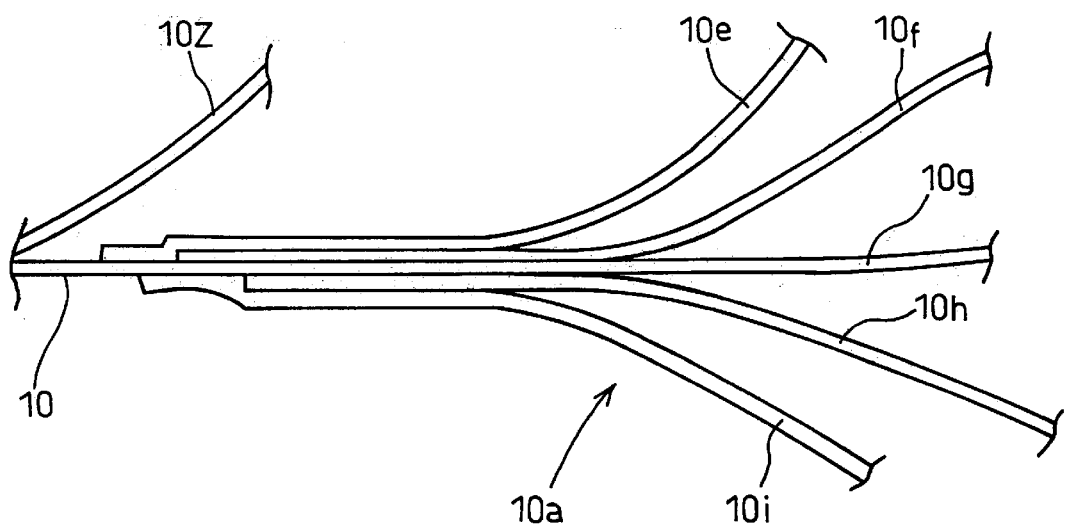
FIG. 22 is a sectional view illustrating another embodiment wherein a preliminary line, projection and head have a tape-like configuration.

Another preferred embodiment wherein the tape-like head 10a and projection 10z are additionally secured to the tape-like preliminary line (line portion) 10 is illustrated in FIG. 22. As shown, the head 10a is composed of five pieces of resin tapes 10e into 10i. Bases of the resin tapes 10e and 10f are adhered to one main face of the tape-like preliminary line 10 into a laminated state. Bases of the resin tapes 10h and 10i are adhered to another main face of the tape-like preliminary line 10 into a laminated state. The end of the preliminary line 10 is composed of the resin tape 10g, which is one part of the head 10a. Similarly, the projection 10z is adhered to the preliminary line 10 downwardly of the end thereof. With this arrangement, the head 10a can be firmly secured to the preliminary line 10 with ease. And entangling of the resin tapes 10e into 10i is restrained.

This results in the damage of the resin tapes 10e into 10i due to striking themselves in a high speed air flow being decreased and the deformability thereof being not lowered. And the resin tapes 10e into 10i can be restrained from being caught by foreign substances. The projection 10z is secured to the preliminary line 10 downwardly of the end thereof similarly, to apply a thrust to the preliminary line 10 downwardly of the end thereof.

(Embodiment 3)

Figure 14:
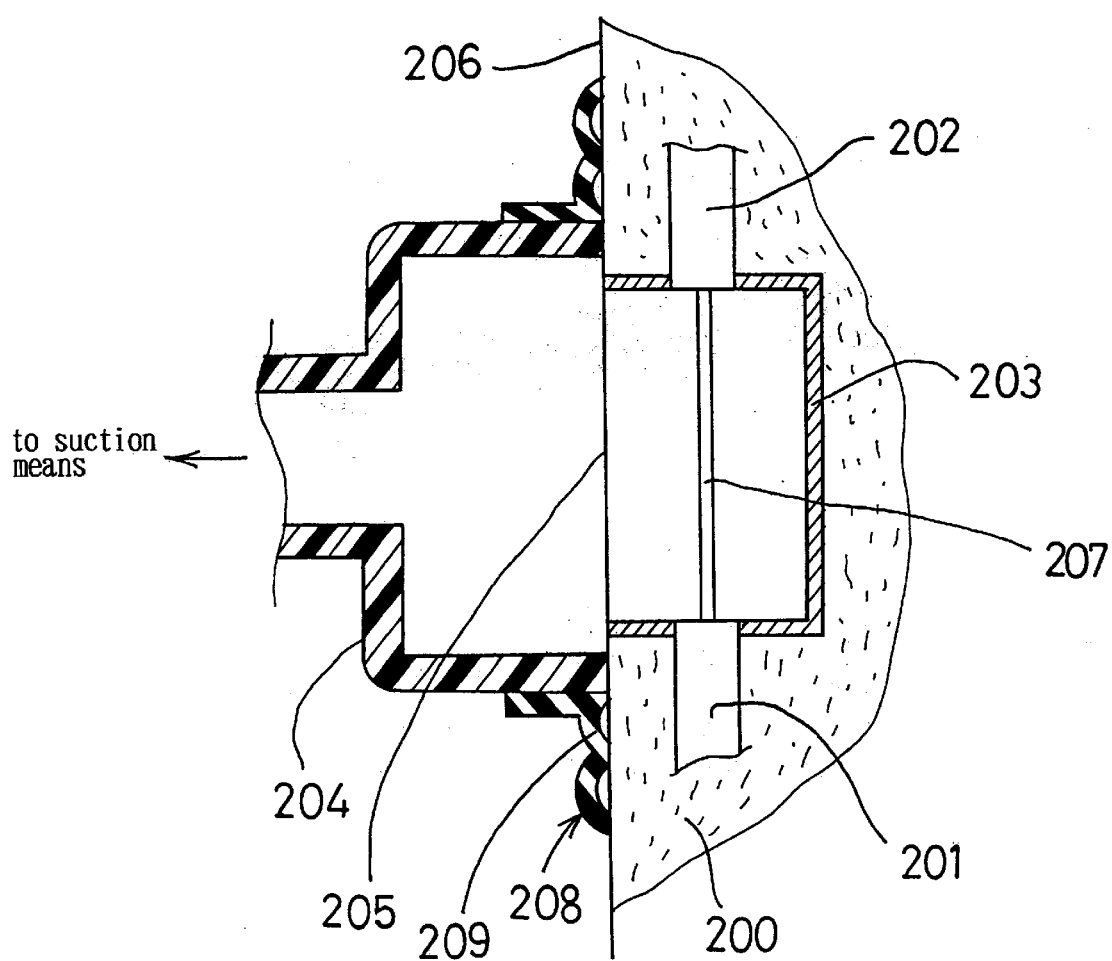
FIG. 14 is a sectional view of one part of one modification of an end of a connecting hose.

A still another embodiment of the vacuum suction type device for inserting a line into a conduit in accordance with the present invention will be explained with reference to FIG. 14. Reference numeral 200 designates a concrete wall. Conduits 201 and 202, and joint box 203 for interconnecting the conduits 201 and 202 are embedded in the concrete wall 200. Reference numeral 204 designates a connecting hose which is connected to a suction cylinder of a suction means (not shown). An end of the connecting hose 204 is in close contact with a wall surface 206 of the concrete wall 200 around an opening 205 of the joint box 203. Reference numeral 207 designates a cable already installed in the conduits 201 and 202, and reference numeral 208 designates a flange portion composed of a soft rubber. The flange portion 208 is secured to the entire periphery of the end of the connecting hose 204. The flange portion 208 has a lip 209 over the entire periphery thereof. When a negative pressure is produced in the interior of the joint box 203 and connecting hose 204 by the operation of the suction means, the lip 209 is pressed on the wall surface 206 with atmospheric air pressure to prevent air leakage thereabout, and the connecting hose 204 is brought into close contact with the wall surface 206 and held in this position. With the present embodiment, if the cable 207 has been already installed in the conduits 201 and 202, the preliminary line can be sucked from the conduit 201 or 202 without any trouble. In this case, it is preferable to seal the conduit from which the preliminary line is not sucked with a silicon compound or the like. The connecting hose 204 is formed transparent so as to facilitate the detection the arrival of the preliminary line at the connecting hose 204. It is preferable that the preliminary line 204 is colored with such a color as to facilitate the detection thereof.

(Embodiment 4)

Figure 15:
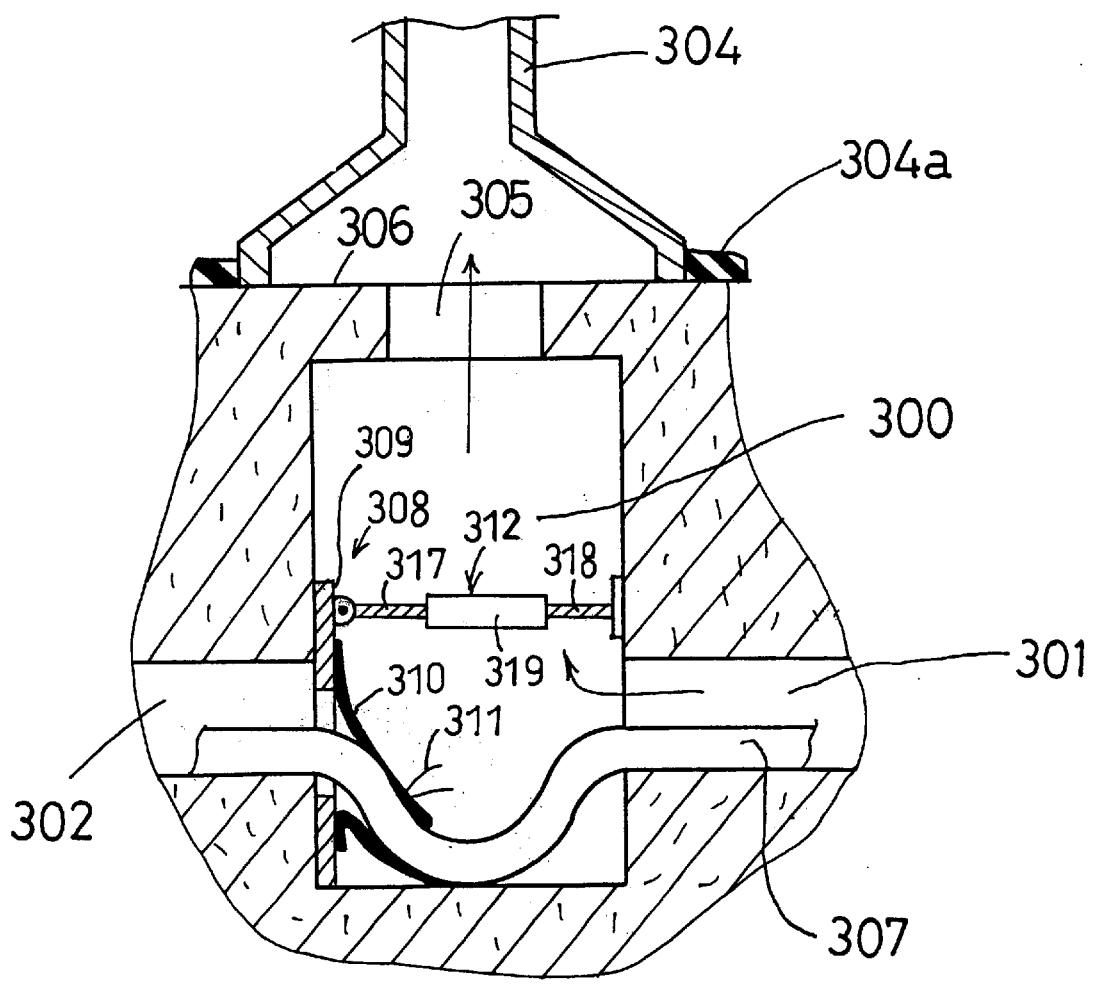
FIG. 15 is a sectional view of one part of another modification of an end of a connecting hose.

A further embodiment of the vacuum suction type device for inserting a line into a conduit in accordance with the present invention will be explained with reference to FIGS. 15 into 17. Reference numeral 300 designates a manhole made of concrete, which is embedded in the ground under the road. One end of each of conduits 301 and 302 is interconnected with the manhole 300. Reference numeral 304 designates a connecting hose which is connected to a suction cylinder of a suction means (not shown). An end of the connecting hose 304 is in close contact with a road surface 306 around an opening 305 of the manhole 300. Reference numeral 307 designates a cable already installed, and reference numeral 304a designates a flange portion composed of a soft rubber. The flange portion 304a is secured to the entire periphery of the end of the connecting hose 304. When a negative pressure is produced in the interior of the manhole 300 and connecting hose 304 by the operation of the suction means, the flange portion 304a is pressed on the road surface 306 with atmospheric air pressure to prevent air leakage thereabout, and the connecting hose 304 is brought into close contact with the road surface 306 and held in this position. With the present embodiment, although the cable 307 has been already installed in the conduits 301 and 302, the preliminary line can be sucked from the conduit 301 or 302 without any trouble.

In the present embodiment, the preliminary line is inserted into the conduit 301. So, the conduits 302 is closed with an interconnection blocking member 308.

Figure 16:
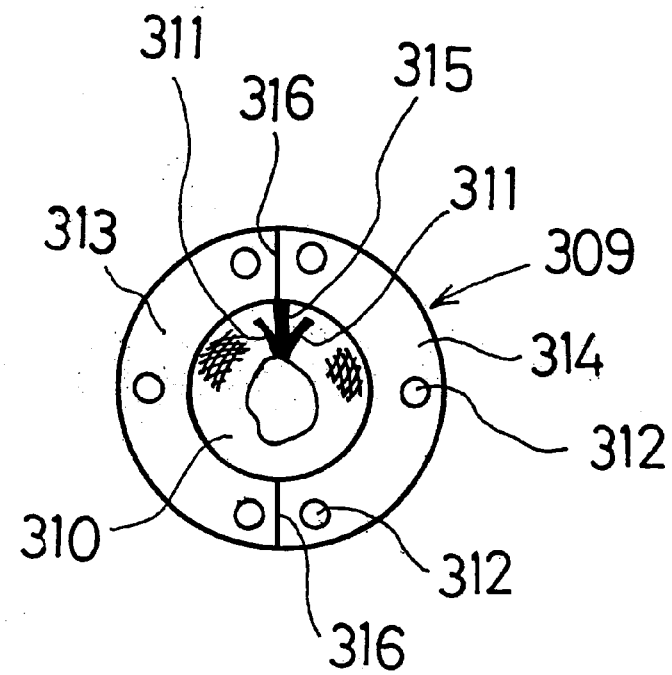
FIG. 16 is a front view of an interconnection blocking member illustrated in FIG. 15.
Figure 17:
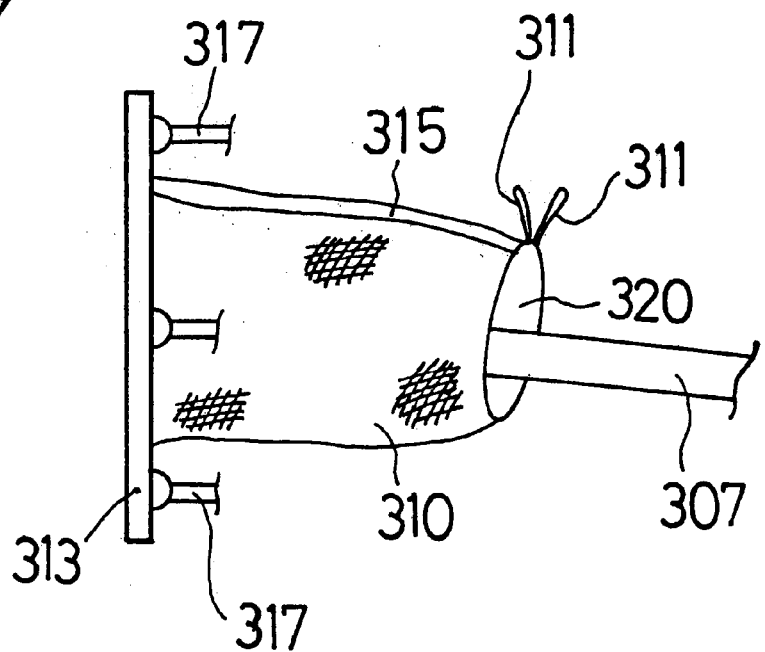
FIG. 17 is a side view of the interconnection blocking member illustrated in FIG. 16.

The interconnection blocking member 308 includes a blind plate 309, a cylinder 310 made of cloth, strings 311 and legs 312. As illustrated in FIGS. 16 and 17, the blind plate 309 has a ring plate-like configuration composed of a pair of semi-circular ring plates 313 and 314. One end of the cloth cylinder 310 is secured to the inner peripheral edge of these semi-circular ring plates 313 and 314. A magic tape part 315 is provided in the cloth cylinder 310 from one end to the other end thereof. By separating the cloth cylinder 310 at the magic tape part 315, it becomes a single piece of cloth. Strings 311 are provided at the end of the fabric cylinder 310 on the side opposite to the blind plate 309 for narrowing the opening of the cloth cylinder 310. Reference numeral 316 designates a borderline between the semi-circular ring plates 313 and 314. Three legs 312 are secured to each of the semi-circular ring plates 313 and 314. As illustrated in FIG. 15, the legs 312 includes a first rod 317 which is turnably secured to the surface of the semi-circular plate 313 or 314, a second rod 318 of which one end contacts the wall defining the manhole 300, and internal thread cylinder 319. An external thread is formed in each of the first rod 317, and second rod 318 for screwing the same to the internal thread cylinder 319. By turning the internal thread cylinder 319, the length of the leg 312 is adjusted. A sponge layer 320 is formed over the entire circumference of the cloth cylinder 310, especially in the vicinity of the strings 311. In the case the cloth cylinder 310 is tightened around a plurality of already installed cables 307 (a single cable in the drawing) with the strings 311, the sponge layer 320 reduces the space between the cable 307 and fabric cylinder 310, thereby decreasing air leakage from the conduit 302 to the manhole 300. Similarly, a sponge layer or rubber layer is also formed on the surface or along the outer peripheral edge of the pair of semi-circular ring plates 313 and 314 on the side facing the concrete wall to prevent air leakage thereabout.

(Modification)

In the preceding embodiments, the flange portion 304a of the connecting hose 304 was pressed on the road surface 306. Alternatively, the connecting hose may be secured to the blind plate 309 or cylinder 310 of the interconnection blocking member 308 to suck air from the conduit 302, thereby sucking the preliminary line from an end (not shown) of the conduit 302. In this case, the blind plate 309 is pressed on the flat wall defining the manhole 300 so that the legs 312 can be omitted.

(Embodiment 5)

Figure 18:
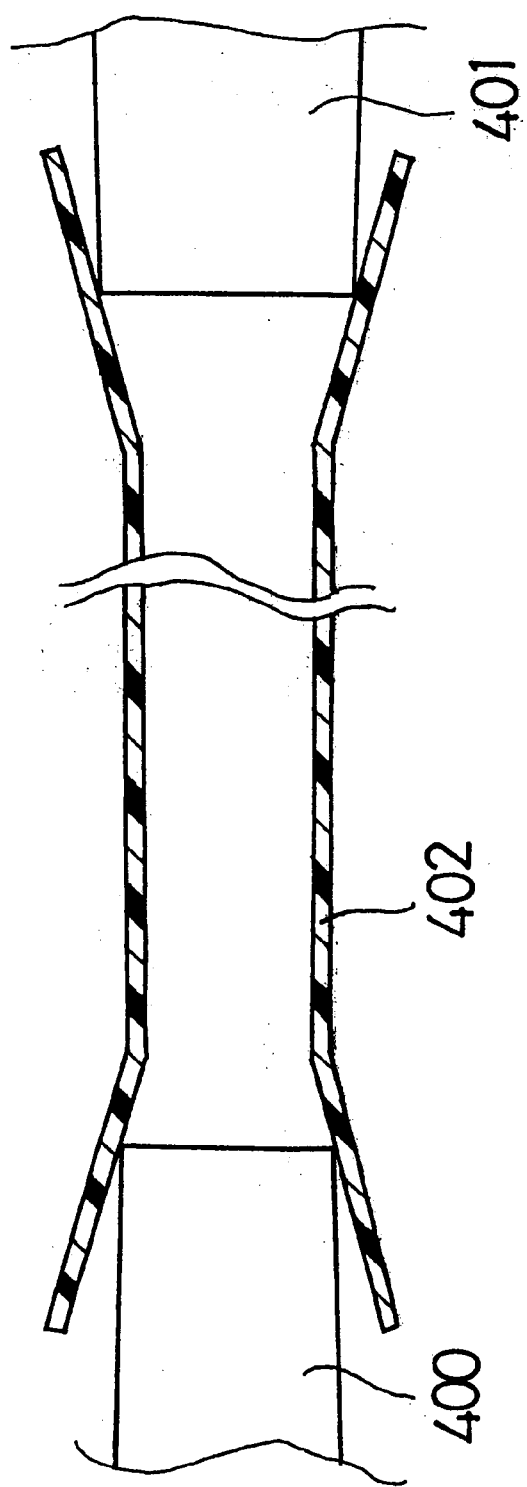
FIG. 18 is a sectional view of one part of one modification of a connecting hose.
Figure 19:
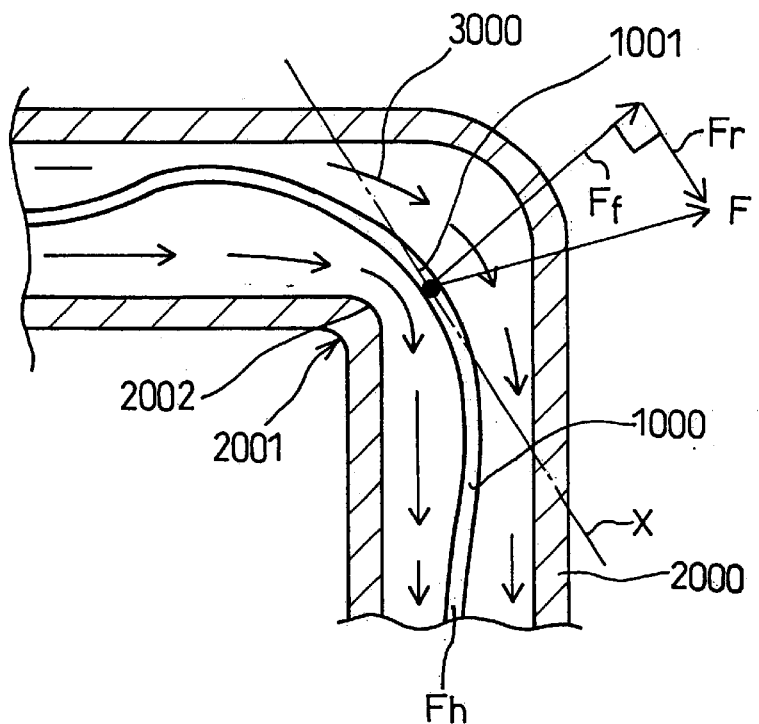
FIG. 19 is a sectional view of one part of a tape-like preliminary line, which illustrates the flying condition thereof in a right-angled conduit.
Figure 20:
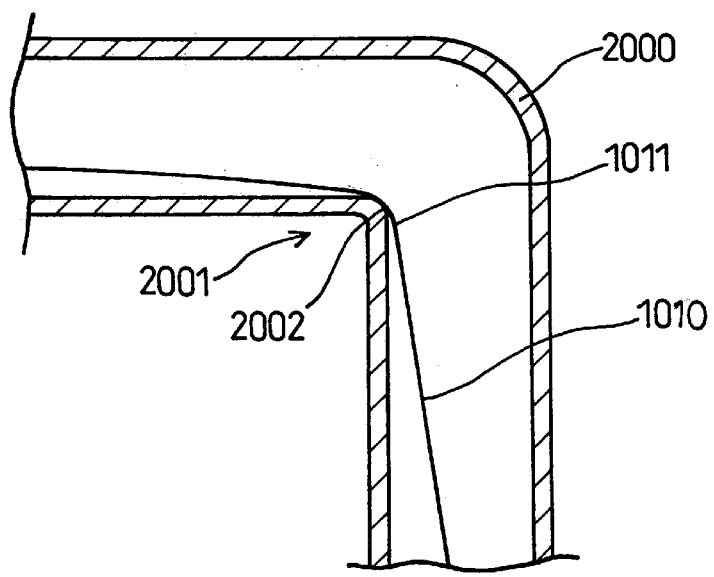
FIG. 20 is a sectional view of one part of a linear preliminary line which moves in a right-angled conduit while being pulled by a head.

A still further embodiment of the vacuum suction type device for inserting a line into a conduit in accordance with the present invention will be explained with reference to FIG. 18. Reference numeral 400 designates a dust suction cylinder of a vacuum cleaner on the market. Reference numeral 401 designates a conduit for inserting a preliminary line, 402 designates a connecting hose for connecting the conduit 401 to the dust suction cylinder 400. The connecting hose 402 is made of a soft transparent resin into a length of 2 m, for example. The connecting hose 402 broadens towards both ends thereof. To reduce the pressure loss, it is preferable that the central part (not shown) of the connecting hose 402 has a diameter greater than that of both ends thereof. By using the soft resin hose which broadens towards both ends thereof, the arrangement of the present embodiment can be applied to the cleaners on the market whenever the diameter of the dust suction cylinders 400 thereof varies. Furthermore, the arrangement of the present embodiment can be applied to the conduits whenever the diameter thereof varies. In addition, since the connecting hose 402 is transparent, the arrival of the preliminary line can be detected with ease.

(Embodiment 6)

Figure 23:
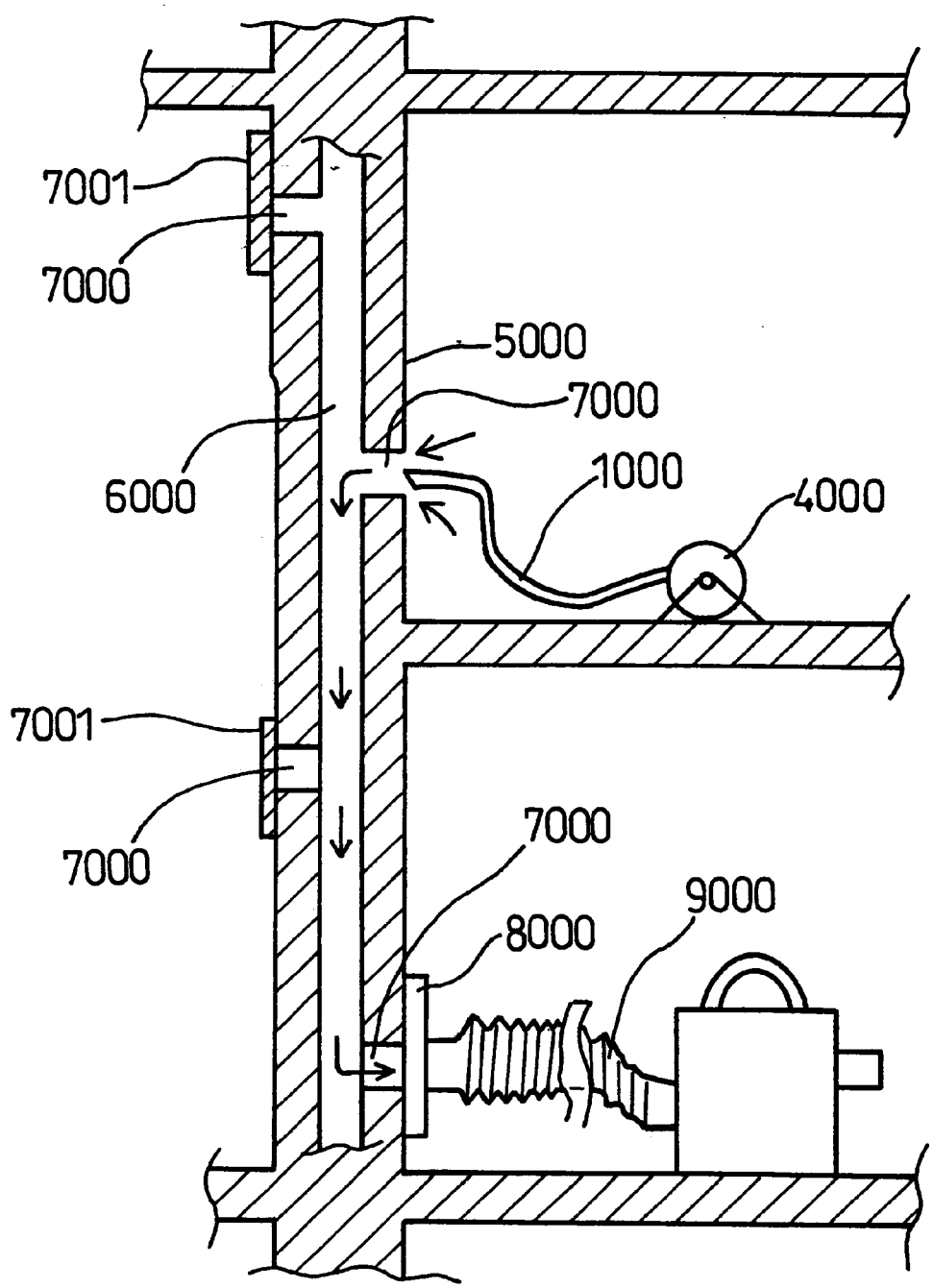
FIG. 23 is a sectional view illustrating another embodiment for making the optical LAN in the old house.

Other embodiment will be explained with reference of FIG. 23. In FIG. 23, 1000 is the tape as the line member. 4000 is the tape reel. 5000 is the wall of the house. 6000 is the telephone pipe in the wall 5000. 7000 are the joint box(the outlet port). 8000 is the seal ring of the connecting hose 9000. 10000 is the vacuum pump. 7001 is the cover plate.

All outlet ports 7000 are covered by the cover plates 7001 except two outlet ports. One of the opening outlet port 7000 is set by the seal ring 8000 and the vacuum pump is driven. Then, the top portion of the tape 1000 is inserted into the other outlet port 7000. By the air stream from upper outlet port (inlet port correctly) 7000 to the lower outlet port 7000, the tape 1000 flies easily. The top portion of the tape 1000 flies into the hose 9000.

The tape 10 as the line member can have the structure of the optical transmission means as shown in FIG. 4 or FIG. 13. In the present embodiment, the line member 10 has the optical fiber 105 and two tapes 106 in FIG. 13. In the present embodiment, the line member 10 has the optical fiber 10d and one tape 10c in FIG. 4. These optical fiber 105 or 10d is made of the plastic fiber coated by the metal film. In the other embodiment, the tape can be adhered on the surface of the wall or the ceiling.

While the invention has been described in connection with what are considered presently to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A line-inserting method comprising steps of:
preparing a tubular conduit having an inlet port and an outlet port, a line member essentially consisting of one thin tape essentially made of plastic resin, which is longer than the length from said inlet port to said outlet port of said tubular conduit, and an air pump;
making an air stream flowing from said inlet port to said outlet port in said tubular conduit by operating said air pump;
inserting a top portion of said tape into said inlet port of said tubular conduit; and,
carrying said tape from said inlet port to said outlet port with fluid mechanical thrust which said air stream flowing in a longitudinal direction of said tape gives to a main surface of said tape.

2. A line-inserting method comprising steps of:
preparing a tubular conduit having an inlet port and an outlet port, a line member essentially comprising at least one thin tape made of plastic resin, which is longer than said tubular conduit, and an air pump;

making an air stream flowing from said inlet port to said outlet port in said tubular conduit by operating said air pump;

inserting a top portion of said tape into said inlet port of said tubular conduit;

carrying said tape from said inlet port to said outlet port with fluid mechanical thrust which said air stream flowing in a longitudinal direction of said tape gives to a main surface of said tape; and covering all ports of said tubular conduit except said inlet port and said outlet port before inserting said top portion of said tape into said inlet port of said tubular conduit.

3. A line-inserting method comprising steps of:

preparing a tubular conduit having an inlet port and an outlet port, a line member essentially comprising at least one thin tape made of plastic resin, which is longer than said tubular conduit, and an air pump;

making an air stream flowing from said inlet port to said outlet port in said tubular conduit by operating said air pump;

inserting a top portion of said tape into said inlet port of said tubular conduit; and, carrying said tape from said inlet port to said outlet port with fluid mechanical thrust which said air stream flowing in a longitudinal direction of said tape gives to a main surface of said tape;

wherein said line member is essentially comprised of plural tapes which are extended in the longitudinal direction of said tapes and said tubular conduit in said tubular conduit.

4. A line-inserting method comprising steps of:

preparing a tubular conduit having an inlet port and an outlet port, a line member essentially comprising at least one thin tape made of plastic resin, which is longer than said tubular conduit, and an air pump;

making an air stream flowing from said inlet port to said outlet port in said tubular conduit by operating said air pump;

inserting a top portion of said tape into said inlet port of said tubular conduit; and, carrying said tape from said inlet port to said outlet port with fluid mechanical thrust which said air stream flowing in a longitudinal direction of said tape gives to a main surface of said tape;

wherein a suction pump as said air pump has a connecting hose of which a suction port has an elastic ring plate pressed on a surface of a wall around said outlet port by suction pressure generated by said suction pump.

5. A line-inserting method comprising steps of:

preparing a tubular conduit having an inlet port and an outlet port, a line member essentially comprising at least one thin tape made of plastic resin, which is longer than said tubular conduit, and an air pump;

making an air stream flowing from said inlet port to said outlet port in said tubular conduit by operating said air pump;

inserting a top portion of said tape into said inlet port of said tubular conduit; and, carrying said tape from said inlet port to said outlet port with fluid mechanical thrust which said air stream flowing in a longitudinal direction of said tape gives to a main surface of said tape;

wherein a suction pump as said air pump has a connecting hose having a tubular part of which the inside is visible from the outside thereof.

* * * * *